United States Patent
Corbett et al.

(10) Patent No.: US 6,221,289 B1
(45) Date of Patent: Apr. 24, 2001

(54) METHOD OF MAKING CERAMIC ELEMENTS TO BE SINTERED AND BINDER COMPOSITIONS THEREFOR

(75) Inventors: James E. Corbett, Mentor; Arvid Wegenek, Parma; John G. Toth, Concorde, all of OH (US)

(73) Assignee: Core-Tech, Inc., Cleveland, OH (US)

( * ) Notice: Subject to any disclaimer, the term of this patent is extended or adjusted under 35 U.S.C. 154(b) by 0 days.

(21) Appl. No.: 09/370,129

(22) Filed: Aug. 6, 1999

Related U.S. Application Data

(60) Provisional application No. 60/096,793, filed on Aug. 7, 1998.

(51) Int. Cl.$^7$ ................................................. C04B 35/638
(52) U.S. Cl. ......................... 264/44; 264/645; 264/638; 264/639; 264/669; 264/670; 264/328.2
(58) Field of Search ..................... 264/645, 669, 264/670, 328.2, 44, 638, 639

(56) References Cited

U.S. PATENT DOCUMENTS

| | | | |
|---|---|---|---|
| 2,422,809 | * 6/1947 | Stupakoff et al. | 264/645 |
| 2,434,271 | * 1/1948 | Howatt | 264/645 |
| 3,234,308 | 2/1966 | Herrmann | 264/63 |
| 3,422,173 | 1/1969 | Bergstrom et al. | 264/59 |
| 4,144,207 | 3/1979 | Ohnsorg | 260/23 S |
| 4,233,077 | 11/1980 | Hazel | 106/43 |
| 4,478,790 | 10/1984 | Huther et al. | 419/54 |
| 4,615,851 | 10/1986 | Theodore et al. | 264/63 |
| 4,721,599 | 1/1988 | Nakamura | 419/23 |
| 4,948,426 | 8/1990 | Kato et al. | 419/23 |
| 5,006,164 | 4/1991 | Kiyota | 75/255 |
| 5,028,367 | 7/1991 | Wei et al. | 264/63 |
| 5,122,326 | 6/1992 | Jackson et al. | 264/102 |
| 5,342,573 | 8/1994 | Amano et al. | 419/38 |
| 5,380,179 | 1/1995 | Nishimura et al. | 419/36 |
| 5,397,531 | 3/1995 | Peiris et al. | 419/36 |
| 5,641,920 | 6/1997 | Hens et al. | 75/228 |
| 5,723,083 | 3/1998 | Bogan, Jr. et al. | 264/177.11 |
| 5,900,207 | 5/1999 | Danforth et al. | 264/603 |

* cited by examiner

Primary Examiner—James Derrington
(74) Attorney, Agent, or Firm—Pearne & Gordon LLP

(57) ABSTRACT

A method and composition for combining ceramic powder and binder to form green elements suitable for shaping and firing uses dry blending techniques. The binder includes a particulate wax component that is not melted in order to combine it with the ceramic powder, but rather, the wax component is combined in particulate form with the ceramic powder. The particulate wax is mixed in conventional blender apparatus in a relatively short time period. The binder composition may also include a lubricity enhancer or slip agent and a dispersion or colloidal binder.

9 Claims, No Drawings

METHOD OF MAKING CERAMIC ELEMENTS TO BE SINTERED AND BINDER COMPOSITIONS THEREFOR

This application claims the benefit of U.S. Ser. No. 60/096,793, filed Aug. 7, 1998.

FIELD OF THE INVENTION AND RELATED ART

The present invention relates to sintered ceramic elements or parts for use in molding a moldable material such as metal. More particularly, the invention relates to processes and binder compositions for forming unfired or green ceramic elements that may be fired to form sintered ceramic elements such as inserts, cores or mold wall components to be used in molds to shape the mold cavity and the moldable material. Following solidification of the material being molded, if the ceramic element comprises a core or insert, it is removed as by leaching, and the molded part is complete.

The inventive processes and binder compositions may be used in various types of shaping processes to form the ceramic element. For example, the invention may be used in extrusion or injection molding processes, but it is particularly useful in connection with injection molding processes.

In the case of extruded ceramic elements, the prior art extrusions contain relatively large amounts of water, e.g. 19% based on the total weight. (Hereinafter, weight percentages are based on the total weight of the green ceramic component materials to be introduced into the shaping apparatus unless otherwise noted or indicated by the context). Any frictional or flow resistance is overcome by the extrusion force which may be several thousands of pounds, e.g. 3000 pounds.

The prior art extrusion materials contain ceramic, water and colloidal silica. A cereal flour is also used to contribute to the binder function. Immediately following extrusion, the extruded parts are dried at 70° F. for several days depending upon the part size. This drying step removes liquids at a slow rate in order to avoid detrimental high temperature removal in the firing cycle.

In the case of inserts that are to be injection molded, the ceramic insert material is initially bound together using a binder formed of about 22 to about 25% wax based on the total weight of the blend or mixture of the materials used to form the green ceramic element. The wax used typically comprises paraffin.

It is believed that the relatively high prior art level of the wax component, e.g. 22 to 25%, is necessary in order to achieve a homogeneous dispersion. The use of reduced amounts of wax is believed to result in non-uniform ceramic distribution. The wax is initially melted and the ceramic powder is mixed with the melted wax in a blender with the addition of ceramic powder occurring over a prolonged period of time, e.g. 4 hours, in a mixing cycle. This melt-blend process is very slow since it is necessary to form a homogeneous dispersion of the ceramic powder in the wax. The powder and wax mixture is then formed into a thin sheet and crushed into small pieces suitable for addition to the injection molding apparatus. This process may take eight to 12 hours.

The crushed wax and ceramic mixture is heated in the injection molding process, and the wax is melted or made tacky to cause it to act as a binder for the ceramic powder. The injection molded insert or piece is then slowly dried to remove organic components such as water. The typical prior art drying cycles are performed at about 70° F. or room temperature, and may last for about five days or more. One prior art technique uses a 10 day drying cycle before firing.

A major disadvantage of the prior art relatively high wax levels is that the green ceramic element must be held in the desired shape during firing. If the green part is not held in shape, puddling may occur with the green ceramic being melted to a puddled mass or some other defect in the part shape may result. If a setter or a sager is not used, the relatively large amount of wax used in the prior art will melt and cause the ceramic to puddle or otherwise be misshapen as opposed to maintaining its desired configuration.

In view of the large amount of wax used in prior art melt-blending techniques, setters must be used to support the part as it is fired. The setters retain the shape of the part during firing since the removal of such a large amount of wax would otherwise result in the part being misshapen. An alternative technique is to place the part in a sager and surround it with alumina type powder in order to hold the shape of the part. (A sager is a ceramic box used to hold a part during firing.) This alternative technique is called wicking since the wax wicks from the part and into the powder as the firing cycle progresses. When the wax reaches the temperature at which it will ignite, it is burned from the powder as well as the green part.

About five years ago, the industry attempted to achieve a 24-hour cycle. That is, the time from injection molding to the completion of the firing is to be as close as possible to a 24 hour time period. The more practical goal is a 72 hour cycle. It is not believed that these goals were previously met.

SUMMARY OF THE INVENTION

It has now been found that ceramic powder and binder compositions suitable for shaping and firing may be prepared using dry blending techniques. That is, the wax component is not melted in order to combine it with the ceramic powder, but rather, the wax component is combined in particulate form with the ceramic powder. The particulate wax is mixed in conventional blender apparatus in a relatively short time period.

Such dry-blending enables the relative amount of wax to be reduced as compared with prior art techniques. For example, the particulate wax component may comprise less than about 20%, and more preferably, less than about 15%, and most preferably about 10 to 12% by weight based on the total weight of the mixture.

The reduction in the amount of wax has been found to enable substantial elimination of prior art drying steps. The green ceramic element may be fired immediately after it is formed without an intermediate drying cycle. The only delay between the completion of the forming or injection molding of the green ceramic and the beginning of its firing is the handling time necessary to position the green ceramic element in the firing furnace.

As noted above, the reduced wax component yields improved green structures that are self-supporting during firing. That is, they do not require the use of sagers or setters and may be fired without external shape supports.

The green ceramic element may include about 8 to about 12% by weight of the wax component, and more preferably, from about 10 to 20% wax. The wax should be of suitable particle size to enable homogenous mixing with the ceramic powder and water. Preferred particle sizes range from about 6 to 22 microns, and more preferably about 100 mesh.

A portion of the wax may comprise a specially formulated lubricity enhancer or slip agent. The slip-agent improves the lubricity of the ceramic material as it is injected into the mold. In the absence of such a lubricity agent, the ceramic material will scrape or scratch the mold. In preferred arrangements, known dispersion or colloidal binders may be included also. For example, about ½ to 40% of colloidal silica may be used. Colloidal silica is a dispersion of fine silica particles in water.

The inventive binder includes wax particles of a size enabling a homogeneous dry-blend with ceramic powder and a melting point that assures binding with pressure and/or heating in the shaping apparatus. Typical particle sizes may range from 6 to 22 microns. The melting or softening point may be in the range of about 140° F. or less to about 200° F. Generally, lower melting point materials are preferred.

A suitable wax may be determined in accordance with the particular shaping apparatus and operating conditions, and the wax should melt or soften and become tacky during shaping to a sufficient degree to lubricate the flow along metallic surfaces and, in cooperation with other binding materials present, bind the ceramic powder together during firing without external surface support. The required wax may be readily identified by trial and error.

In particularly preferred arrangements, the wax component comprises a low molecular weight alkane of $C_{24}$ to $C_{40}$, e.g. paraffin having the formula, $C_{36}H_{24}$, a lubricity improving wax component or slip agent such as a substituted polyethylene, water and colloidal silica. This binder is combined with the ceramic powder and loaded into the injection molding apparatus. The consistency of the blended binder and ceramic is that of a damp powder. The blended material substantially feels dry, but it will clump if squeezed together by hand. The clump is easily broken.

The invention is also useful in connection with ceramic blends such as alumina/silica sold under the designation Mullite by Kyanite Mines. Other ceramics with which the invention may be used include alumina/zirconia, calcium stabilized zirconia, alumina oxide, silicon nitride, silicon carbide and alumina/TiC.

It is estimated that interstice or pore size of the resulting sintered element ranges from ½ to ¼ of a thousandth of an inch. That is, from 0.00025" to 0.0005". This is the size of the pore after the wax and other organics are removed or burned-out during the firing cycle. Upon firing, the wax is melted and removed, and the ceramic particles which are shaped as spheres are touching. The ceramic particles are sintered together to form the insert.

To the best of applicant's knowledge, it was not previously known to dry blend the binder wax components with the ceramic powder to form green ceramic elements. (It should be appreciated that water and, optionally, colloidal silica are also added to the ceramic powder.)

In contrast with the prior art, the inventive binder is sufficient to hold the green ceramic element in its molded shape with no assistance during the firing cycle. That is, the binder has sufficient strength and integrity to maintain the shape of the green element until the wax and other organics have been completely driven-off during firing and the ceramic particles are sintered together. No external support is required to maintain the shape of the insert or part during this firing cycle.

The injection molded parts in accordance with the invention have no drying cycle since much of the water has been eliminated from the formulation as compared with the prior art. Presently, the formulation amount of water cannot be similarly reduced in the extruded parts since the extruder is not heated. Heating of the extrusion apparatus may be necessary to enable the use of reduced amounts of water in extrusion processing.

The invention is based in-part on the realization that dry blending of the binder wax and ceramic powder may be used to achieve a homogeneous blend of the components. The particular binder materials are not critical. That is, any wax or paraffin that has a suitable melt temperature and provides sufficient lubricity as well as adhesion to hold the ceramic together as it removed from the injection molding apparatus may be used. The wax should have a suitable initial particle size to provide homogeneous dry blending with the ceramic material.

DETAILED DESCRIPTION OF THE PREFERRED EMBODIMENTS

The present invention is applicable to a wide range of ceramic materials. Silica is a preferred ceramic since it sinters at a low temperature in the range of about 1800 to 19000° F. Further, silica is easily leached from the molded part or casting. That is, the molded part or casting including a sintered silica ceramic element may be dipped in a caustic or salt bath material to leach out the silica. In contrast, zircon or alumina are not leached by caustics and other techniques are used for their removal from the molded part.

In contrast with prior art day-long mixing techniques, the ceramic and binder materials of the invention may be mixed in about 30 to 40 minutes to form a homogeneous 60 pound batch. The mixture may be fed or introduced directly into an injection molding apparatus. Following injection molding, the parts may be directly placed in a furnace for firing. Thirty-five hours later the sintered ceramic cores or parts are ready for shipment.

EXAMPLE 1

A green ceramic material suitable for injection molding is prepared using a Muller manufactured by Simpson Company. In order to prepare a 30 pound batch of green material the following components are blended.

23.43 lbs. silica/zirconia ceramic[1]

3.00 lbs. paraffin wax[2]

0.60 lbs. ethylene bis-stearamide[3]

0.99 lbs. water 1.98 lbs. colloidal silica[4]

1 This is an 80/20 weight percent mixture of silica and zirconia sold under the designation Ranco Sil 120/Zircon Flour by Ransom & Randolph Company.
2 This is a particulate synthetic paraffin wax sized at NPIRI Grind (ASTM D-1316) of 4.0–5.0 (a particle size 5 microns) and having a melting point of 215–223° F. sold under the designation MP-22 by Micro Powders, Inc. of Tarrytown, N.Y.
3 This is a particulate ethene homopolymer lubricity wax (N-N' Ethylene bis-stearamide) sized at NPIRI Grind (ASTM D-1316) of 2.0–3.0 (a particulate size 6 microns) and having a melting point of 255–278° F. sold under the designation Superslip 6515 by Micro Powders, Inc. of Tarrytown, N.Y.
4 This is a colloidal silica sold under the designation Nvacol 830 by Ransom & Randolph Company.

The components are added to the blender in any suitable order and they are mixed at room temperature until a homogenous blend is achieved. For this 30 pound charge and blender apparatus typical mixing times are in the order of ¼ to ½ hours. The blended mixture remains in powder form with only a slight dampness resulting from the liquid components.

The Superslip is a lubricity agent allowing the blended materials to more readily flow through the injection molding apparatus and into the mold cavity without abrasion of the latter. It may be possible to delete the Superslip depending upon the paraffin wax and ceramic material.

The mixed ceramic and binder components may be stored or directly introduced into an injection molding machine. In this case, the mixed components are fed into a screw injection molding machine sold by Newbury. The injection molding machine includes a barrel heater that heats the material therein to about 190° F. The green ceramic mixture is directly injected into matched metal dies to shape the green ceramic insert. The pressure and heat of the injection molding step is sufficient to melt or soften the wax components to cause them to lubricate the flow of ceramic mixture through the injection molding apparatus and into the metal mold. The cycle time for cylindrical inserts weighing about two ounces is 10 seconds.

The shaped green ceramic element is removed from the mold and may be stored or directly loaded into a furnace for firing. As noted above, the melting and/or softening of the wax components also causes them to cooperate with the water and colloidal silica to form a self-supporting green ceramic element.

Typical firing includes stepping the temperature of the furnace in 100° F. increments to about 1900 to 2000° F. and holding this temperature for six hours. This removes all wax and other organic matter from the green element, sinters the remaining ceramic together and thereby forms the sintered ceramic element.

The sintered ceramic elements are allowed to cool to room temperature. They are then ready for use in a mold to form a molded part.

One illustrative application of the ceramic elements is the investment casting of titanium golf club heads. The ceramic elements are of cylindrical shape and they are inserted in the head molds to form the shaft receiving opening in the head for receiving the club shaft. Following the metal casting, the ceramic elements are removed from the cast metal head by leaching with sodium hydroxide caustic in a known manner.

What is claimed is:

1. A method of shaping by extrusion or injection molding a ceramic part to be sintered comprising the steps of:
   (a) combining a ceramic powder with a binder comprising a particulate wax in a blending process to form a homogeneous mixture of said ceramic powder and binder including said particulate wax, said particulate wax having a particle size of about 100 mesh or smaller;
   (b) shaping the homogeneous mixture with a force of about 3000 pounds and heat to cause the particulate wax to bind the ceramic powder in the shape of the ceramic part, and
   (c) heating the shaped ceramic part to substantially remove said binder and sinter said ceramic powder with the formation of interstices ranging in size from about 0.00025" to about 0.0005".

2. A method as in claim 1, wherein steps (b) and (c) are performed without an intermediate drying step.

3. A method as in claim 2, wherein said binder includes about 8 to 20% of said wax.

4. A method as in claim 2, wherein said binder includes water and colloidal silica.

5. A method as in claim 4, wherein said binder contains about 8 to about 20% of said wax, about 5 to 12% water based on the total weight of said homogeneous mixture.

6. A method as in claim 5, wherein said ceramic powder is silica.

7. A method as in claim 6, wherein said wax is paraffin having a melting point of from about 160 to 170° F.

8. A method as in claim 1, wherein said particulate wax has a particle size of about 100 mesh.

9. A method as in claim 1, wherein said particulate wax has a particle size in the range of from about 6 microns to about 22 microns.

* * * * *